United States Patent
Naitou (10) Patent No.: US 12,142,969 B2
(45) Date of Patent: Nov. 12, 2024

(54) ROTOR UNIT, ELECTRIC MOTOR, AND ELECTRIC ACTUATOR

(71) Applicant: NTN Corporation, Osaka (JP)

(72) Inventor: Yuuki Naitou, Shizuoka (JP)

(73) Assignee: NTN CORPORATION, Osaka (JP)

(*) Notice: Subject to any disclaimer, the term of this patent is extended or adjusted under 35 U.S.C. 154(b) by 659 days.

(21) Appl. No.: 17/059,553

(22) PCT Filed: Jun. 4, 2019

(86) PCT No.: PCT/JP2019/022095
§ 371 (c)(1),
(2) Date: Nov. 30, 2020

(87) PCT Pub. No.: WO2019/239952
PCT Pub. Date: Dec. 19, 2019

(65) Prior Publication Data
US 2021/0234421 A1    Jul. 29, 2021

(30) Foreign Application Priority Data
Jun. 13, 2018    (JP) ................. 2018-112896

(51) Int. Cl.
*H02K 1/278*    (2022.01)
*H02K 1/30*    (2006.01)
(Continued)

(52) U.S. Cl.
CPC ............ *H02K 1/278* (2013.01); *H02K 1/30* (2013.01); *H02K 7/06* (2013.01); *H02K 7/116* (2013.01)

(58) Field of Classification Search
CPC H02K 1/278; H02K 1/30; H02K 7/06; H02K 7/116; H02K 7/003; H02K 1/28
See application file for complete search history.

(56) References Cited

U.S. PATENT DOCUMENTS

| 9,472,984 B2 | 10/2016 | Taniguchi |
| 2011/0057523 A1 | 3/2011 | Li et al. |

(Continued)

FOREIGN PATENT DOCUMENTS

| CN | 102013780 | 4/2011 |
| CN | 102244424 | 11/2011 |

(Continued)

OTHER PUBLICATIONS

English translation of JP-2006-025509-A (Year: 2006).*

(Continued)

*Primary Examiner* — Tulsidas C Patel
*Assistant Examiner* — Joshua Kiel M Rodriguez
(74) *Attorney, Agent, or Firm* — Wenderoth, Lind & Ponack, L.L.P.

(57) ABSTRACT

A rotor unit 1 used in an electric motor, the rotor unit 1 including a rotor core 5, a rotary shaft 3 inserted in an inner periphery of the rotor core 5, a plurality of magnets 6 attached to an outer peripheral surface of the rotor core 5, and a cover member 4 covering an outer periphery of each of the plurality of magnets 6, in which the rotary shaft 3 is provided, on an outer peripheral surface of the rotary shaft 3, with a caulking part 3c configured to restrict an axial movement of the rotor core 5 with respect to the rotary shaft 3, and the caulking part 3c is configured to restrict an axial movement of the cover member 4 with respect to the rotor core 5.

6 Claims, 5 Drawing Sheets

(51) Int. Cl.
*H02K 7/06* (2006.01)
*H02K 7/116* (2006.01)

(56) References Cited

U.S. PATENT DOCUMENTS

| | | | | |
|---|---|---|---|---|
| 2011/0169357 | A1* | 7/2011 | Gieras | B64C 13/50 |
| | | | | 310/83 |
| 2013/0127283 | A1 | 5/2013 | Matsumoto et al. | |
| 2013/0334926 | A1* | 12/2013 | Taguchi | H02K 15/02 |
| | | | | 29/598 |
| 2014/0062245 | A1 | 3/2014 | Taniguchi | |
| 2017/0279323 | A1 | 9/2017 | Kinoto et al. | |
| 2018/0069450 | A1 | 3/2018 | Takeuchi et al. | |
| 2019/0264788 | A1 | 8/2019 | Shimizu | |

FOREIGN PATENT DOCUMENTS

| | | |
|---|---|---|
| CN | 106655570 | 5/2017 |
| CN | 107005108 | 8/2017 |
| EP | 3 293 860 | 3/2018 |
| JP | 11-299149 | 10/1999 |
| JP | 2001-25193 | 1/2001 |
| JP | 2006-025509 | 1/2006 |
| JP | 2007-181314 | 7/2007 |
| JP | 2011-239614 | 11/2011 |
| JP | 2011-254663 | 12/2011 |
| JP | 2011-254677 | 12/2011 |
| JP | 2014-155243 | 8/2014 |
| JP | 2018-74791 | 5/2018 |
| WO | 2018/062350 | 4/2018 |

OTHER PUBLICATIONS

English translation of JP-2011-239614-A (Year: 2011).*
Extended European Search Report issued Jan. 28, 2022 in corresponding European Patent Application No. 19818795.7.
International Search Report issued Aug. 13, 2019 in International (PCT) Application No. PCT/JP2019/022095.
International Preliminary Report on Patentability and Written Opinion of the International Searching Authority issued Dec. 15, 2020 in International (PCT) Application No. PCT/JP2019/022095.

* cited by examiner

ROTOR UNIT, ELECTRIC MOTOR, AND ELECTRIC ACTUATOR

TECHNICAL FIELD

The present invention relates to a rotor unit, an electric motor, and an electric actuator.

BACKGROUND ART

There is known an electric motor provided with a so-called surface permanent magnet (SPM) rotor in which a magnet is attached to an outer peripheral surface (outside surface) of a rotor core is provided as an electric motor used as a drive source for electric components of vehicles such as automobiles and various electronic devices.

In this type of electric motor, the magnet may fall off from the rotor core due to a centrifugal force of the rotor core, or the damaged magnet may scatter fragments. There has been proposed an electric motor provided with a cover member that covers the magnet to prevent the magnet from falling off and scattering fragments (see Patent Literatures 1 and 2).

The cover member has, for example, a cylindrical shape, and is attached by being press-fitted or fitted onto an outer periphery of the rotor core so as to cover the magnet. In addition, an adhesive has been used in the known art in order to reliably fix the cover member.

CITATIONS LIST

Patent Literature 1: JP 2001-25193 A
Patent Literature 2: JP 2007-181314 A

SUMMARY OF INVENTION

Technical Problem

However, the adhesive is difficult to use as a fixing means because the adhesive may extend out of an applied location or an applying amount of the adhesive may be insufficient. Further, a method using the adhesive takes time for the adhesive to cure, and thus the cover member cannot be assembled to the rotor unit during the time for curing. In addition, there is a concern that an adhesive strength may decrease due to deterioration over time.

An object of the present invention is to provide a rotor unit capable of reliably fixing a cover member without using an adhesive, and an electric motor and an electric actuator including the rotor unit.

Solutions to Problem

In order to solve the above problems, the present invention is a rotor unit used in an electric motor, the rotor unit including a rotor core, a rotary shaft inserted in an inner periphery of the rotor core, a plurality of magnets attached to an outer peripheral surface of the rotor core, and a cover member covering an outer periphery of each of the plurality of the magnets, in which the rotary shaft is provided, on an outer peripheral surface of the rotary shaft, with a caulking part configured to restrict an axial movement of the rotor core with respect to the rotary shaft, and the caulking part is configured to restrict an axial movement of the cover member with respect to the rotor core.

As described above, in the rotor unit of the present invention, the cover members can be fixed to the rotor by restricting the axial movement of the cover member with respect to the rotor core by the caulking part provided on the rotary shaft, thereby eliminating the need for using an adhesive.

The cover member may include a pair of cover members having a peripheral wall covering the outer periphery of each magnet, an opening formed at a first axial end of the peripheral wall, an end wall provided at a second axial end of the peripheral wall and covering end surfaces of each magnet and the rotor core. In this case, the pair of cover members can be attached to the outer periphery of each magnet such that the respective openings face each other, thereby eliminating the need for bending (caulking) an opening edge of each cover member in an inner diameter direction to form the end wall after mounting the cover member, for example, unlike a case in which a bottomed cylindrical cover member that is longer in the axial direction than the rotor core is fixed to the rotor core. As described above, the above configuration eliminates the need for caulking the cover members after being attached. This can prevent interference between the cover members and a stator due to expansion of the cover members in an outer diameter direction by the caulking, and prevent damage to the magnets due to a load applied to the magnets as the cover members are caulked.

Further, the cover members are held in the axial direction by the caulking part and the rotor core, and thus the cover members can be more reliably fixed to the rotor core.

A plurality of protruding engagement parts is provided on an inner peripheral surface of the rotor core at intervals in the peripheral direction, and a plurality of recessed engagement parts engaged with the plurality of protruding engagement parts is provided on an outer peripheral surface of the rotary shaft at intervals in the peripheral direction. This engagement of the recessed engagement parts and the protruding engagement parts can reliably restrict a rotation of the rotor core with respect to the rotary shaft.

Furthermore, when the caulking part is divided in the peripheral direction through the plurality of recessed engagement parts, the recessed engagement parts function as a slit that allows the caulking part to deform in the outer diameter direction, and this facilitates caulking of the caulking part.

The cover members preferably have a cylindrical shape so as to entirely cover the plurality of magnets. The cover members formed in this manner make it possible to reliably prevent the magnets from falling off and scattering when the magnets are damaged.

The rotor unit of the present invention is applicable to the electric motor including the rotor core, the rotary shaft inserted in the inner periphery of the rotor core, the plurality of magnets attached to the outer peripheral surface of the rotor core, the cover members covering the outer periphery of the plurality of magnets, and a stator that imparts rotational force to the rotor core.

Further, the electric motor of the present invention is applicable to the electric actuator including a motion conversion mechanism that converts a rotation of the electric motor into a linear motion, or a speed reduction mechanism that decelerates and transmits the rotation of the electric motor.

Advantageous Effects of Invention

The present invention allows the cover member to be fixed to the rotor core by the caulking part provided on the rotary shaft, thereby eliminating the need for an adhesive used in the known art. This eliminates inconvenient handling and time required for curing when the adhesive is used, and improves assembling workability. Further, mechanically fixing the cover members by the caulking part reduces a risk of a decrease in fixing force due to deterioration over time and improves reliability.

DESCRIPTION OF EMBODIMENT

Hereinafter, the present invention will be described with reference to the accompanying drawings. In each of the drawings for explaining the present invention, components such as members and components having the same function or shape are given the same reference numerals as far as the components are distinguishable from each other, and the description thereof will be omitted after being described once.

Figure 1:
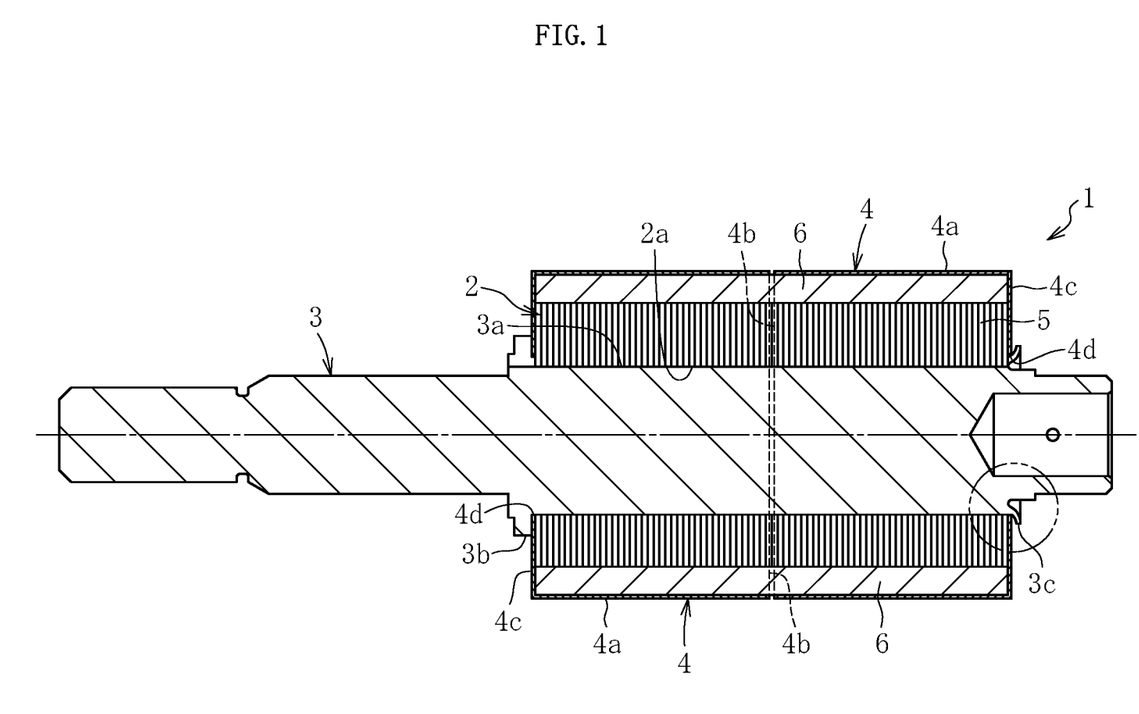
FIG. 1 is a vertical sectional view of a rotor unit according to an embodiment of the present invention.
Figure 2:
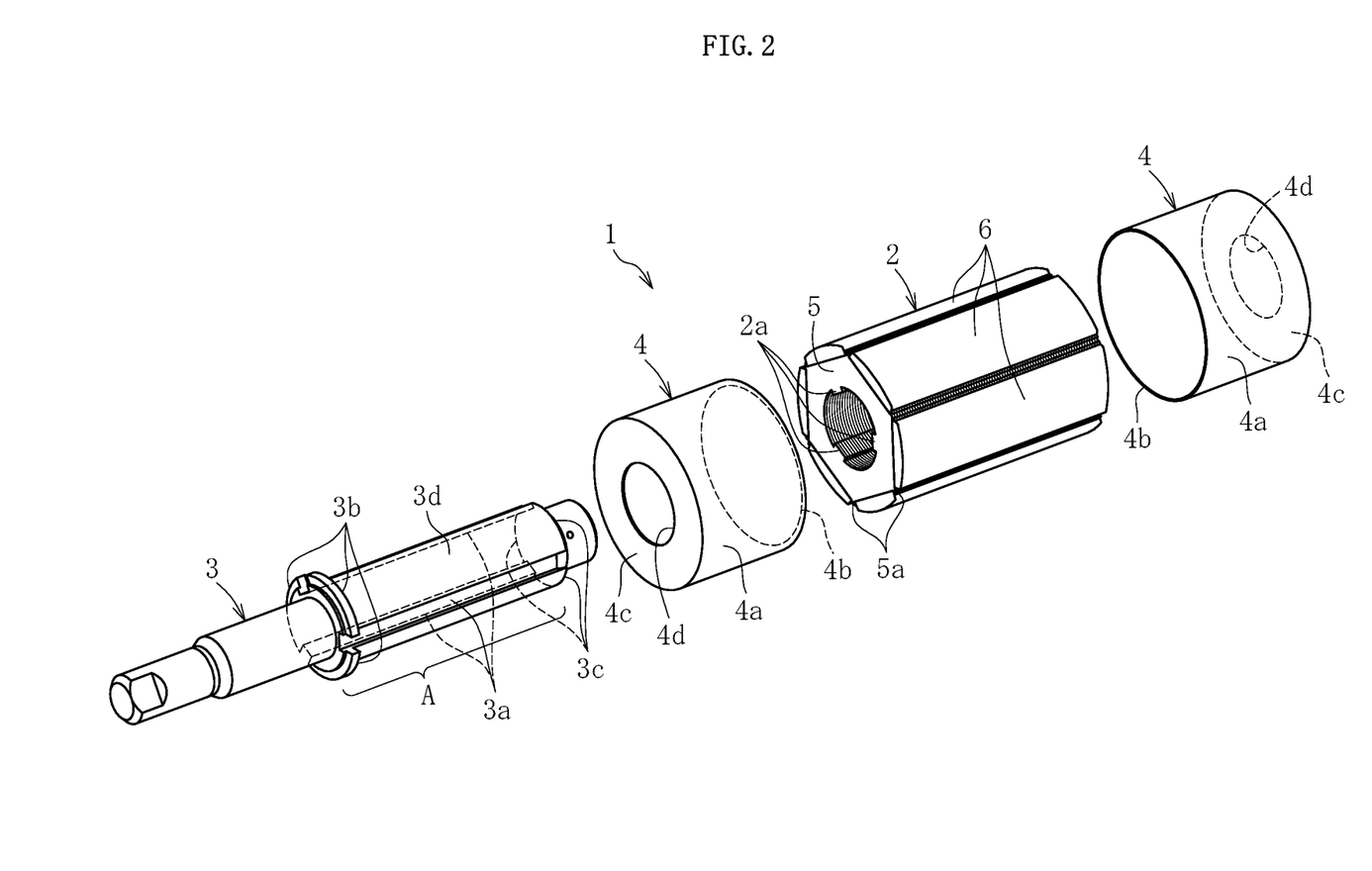
FIG. 2 is an exploded perspective view of the rotor unit shown in FIG. 1.
Figure 3:
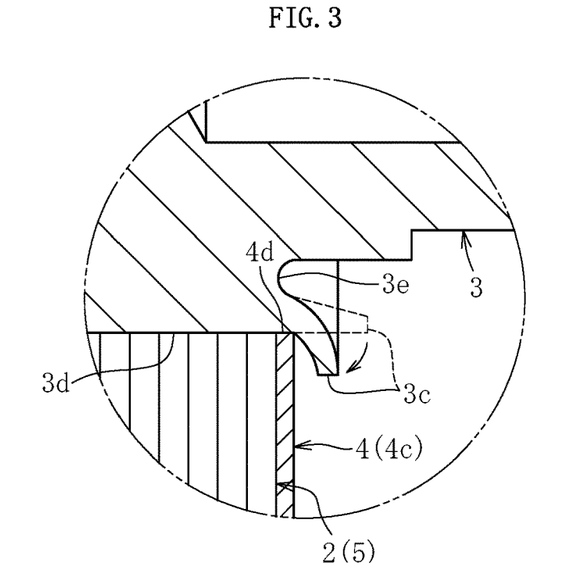
FIG. 3 is an enlarged sectional view showing an enlarged part surrounded by a chain double-dashed line in FIG. 1.

FIG. 1 is a vertical sectional view of a rotor unit according to an embodiment of the present invention. FIG. 2 is an exploded perspective view of the rotor unit shown in FIG. 1. FIG. 3 is an enlarged view showing an enlarged part surrounded by a chain double-dashed line in FIG. 1.

As shown in FIGS. 1 and 2, a rotor unit 1 according to the present embodiment includes a rotor 2, a rotary shaft 3, and a cover member 4.

With the rotor unit 1 being applied to an electric motor, the rotor 2 is a member disposed so as to face a stator forming the electric motor, and rotated by an action of magnetic flux generated between the rotor 2 and the stator when electric power is supplied to coils of the stator. Specifically, the rotor 2 includes an annular rotor core 5 formed from a plurality of stacked steel plates (for example, electromagnetic steel plates) in an axial direction and a plurality of magnets 6 attached to an outer peripheral surface of the rotor core 5. On the outer peripheral surface of the rotor core 5, a plurality of projecting claws 5a that engages with both peripheral end surfaces of each magnet 6 is provided. Inserting each magnet 6 between a pair of the claws 5a in the axial direction allows the magnet 6 to be held by the pair of claws 5a so as not to be detached in an outer diameter direction. Furthermore, an adhesive may be applied to a reverse surface of each magnet 6, and each magnet 6 may be bonded to the outer peripheral surface of the rotor core 5 to prevent each magnet 6 from being detached from the rotor core 5 in the axial direction.

The rotary shaft 3 includes a solid metal body and is inserted (or press-fitted) into an inner periphery of the rotor core 5. On the outer peripheral surface of the rotary shaft 3, a plurality of recessed engagement parts 3a extending in the axial direction is provided at intervals in a peripheral direction. Meanwhile, on an inner peripheral surface of the rotor core 5, a plurality of protruding engagement parts 2a extending in the axial direction is provided at intervals in the peripheral direction so as to correspond to the plurality of recessed engagement parts 3a provided on the rotary shaft 3. As shown in FIG. 1, while the rotary shaft 3 is inserted (or press-fitted) into the rotor 2 and assembled, the recessed engagement parts 3a and the protruding engagement parts 2a engage with each other, and this engagement restricts a peripheral rotation between the rotor 2 and the rotary shaft 3. That is, the recessed engagement parts 3a and the protruding engagement parts 2a engage with each other to function as a detent structure that restricts the rotation between the inner peripheral surface of the rotor 2 and the outer peripheral surface of the rotary shaft 3. In the present embodiment, three recessed engagement parts 3a and three protruding engagement parts 2a are provided. However, the number of these engagement parts can be changed as appropriate, and at least one recessed engagement part and at least one protruding engagement part are sufficient to function as a detent structure.

Two cover members 4 are provided. Each cover member 4 has a peripheral wall 4a having a cylindrical shape, an opening 4b disposed at a first axial end of the peripheral wall 4a, an end wall 4c provided at a second axial end of the peripheral wall 4a, and a through hole 4d having a circular shape and disposed at a center of the end wall 4c. As shown in FIG. 1, each cover member 4 is attached to the outer periphery of the rotor 2 with the respective openings 4b facing each other. In this state, the outer periphery of each magnet 6 is covered with the peripheral wall 4a of each cover member 4, and the end surfaces of each magnet 6 and the rotor core 5 are covered with the end wall 4c of each cover member 4.

Further, as shown in FIG. 1, the outer peripheral surface of the rotary shaft 3 is provided with a flange 3b integrally formed so as to protrude in the outer diameter direction and a caulking part 3c formed by caulking the outer peripheral surface of the rotary shaft 3 to bend in the outer diameter direction on the outer peripheral surface of the rotary shaft 3 as axial movement restrictors that restricts axial movements of the rotor 2 and the cover members 4 with respect to the rotary shaft 3. The flange 3b and the caulking part 3c are provided on opposite sides from each other with the rotor 2 and the cover members 4 interposed therebetween, which restricts the movements of the rotor 2 and the cover members 4 in one axial direction and the opposite axial direction.

Next, a method of assembling each component of the rotor unit 1 according to the present embodiment will be described.

As shown in FIG. 2, with the rotary shaft 3, the rotor 2, and the pair of cover members 4 separated from each other, each cover member 4 is first attached to the rotor 2. Specifically, the opening 4b of each cover member 4 is oriented so as to face each end of the rotor 2, one of the cover members 4 is attached to the rotor 2 so as to be fitted from a first end of the rotor 2, and the other cover member 4 is attached to the rotor 2 so as to be fitted from a second end of the rotor 2. Thus, the outer peripheral surface and both end surfaces of the rotor 2 including the entire magnets 6 are covered with the cover members 4 (see FIG. 1).

Next, the rotary shaft 3 is assembled to the rotor 2 with the cover members 4 attached.

Here, as shown in FIG. 3, on the rotary shaft 3 that is unassembled, the caulking part 3c is not caulked, and the caulking part 3c is disposed so as to be flush with the outer peripheral surface 3d of an axial region A (see FIG. 2) provided with the recessed engagement parts 3a or so as not to protrude toward the outer diameter direction from the outer peripheral surface 3d. As described above, on the rotary shaft 3 that is unassembled, the caulking part 3c is formed so as not to protrude from the outer peripheral surface 3d toward the outer diameter direction. Thus, the caulking part 3c does not interfere with the inner peripheral surface of the rotor 2 and an edge of the through hole 4d of each cover member 4, and the rotary shaft 3 can be inserted from the caulking part 3c into the inner periphery of the rotor 2 and the through hole 4d of each cover member 4.

Inserting the rotary shaft 3 into the rotor 2 and the cover members 4 causes the rotor 2 abut on the flange 3b of the rotary shaft 3 via one of the cover members 4, which restricts the movements of the rotor 2 and the cover members 4 in one axial direction. Then, in this state, as shown in FIG. 3, the caulking part 3c is caulked so as to be bent in the outer diameter direction. As shown in FIG. 3, in the present embodiment, a groove 3e extending in the peripheral direction is formed on an inner diameter surface of the caulking part 3c. The groove 3e is widened by a tool such as a wedge driven into the groove 3e, and thus the caulking part 3c can be caulked by being bent in the outer diameter direction. Further, in the present embodiment, the caulking part 3c is divided in the peripheral direction via the plurality of recessed engagement parts 3a. Thus, upon caulking of the caulking part 3c, the recessed engagement parts 3a function as slits that allow the caulking part 3c to deform in the outer diameter direction. This facilitate the caulking of the caulking part 3c.

In this way, by the caulking of the caulking part 3c, the caulking part 3c restricts the movements of the rotor 2 and the cover members 4 to the other axial direction (opposite direction to the flange 3b). That is, as shown in FIG. 3, the caulking part 3c that has been caulked contacts (closely contacts) the inner diameter surface of the end wall 4c of the other cover member 4 (edge of the through hole 4d), which restricts the axial movements of the rotor 2 and each cover member 4. This can prevent the rotor 2 and the cover members 4 from being separated from each other in the axial direction. Further, the cover members 4 are held in the axial direction by the caulking part 3c and end surfaces of the rotor 2, and thus the cover members 4 are firmly and reliably fixed to the rotor 2.

As described above, in the rotor unit 1 according to the present embodiment, the cover members 4 can be fixed to the rotor 2 by the caulking part 3c provided on the rotary shaft 3, thereby eliminating the need for the adhesive used in the known art. Then, this solves issues of inconvenient handling and time required for curing when the adhesive is used, and improves assembling workability. Further, mechanically fixing the cover members 4 by the caulking part 3c reduces a risk of a decrease in fixing force due to deterioration over time and improves reliability.

Figure 4:
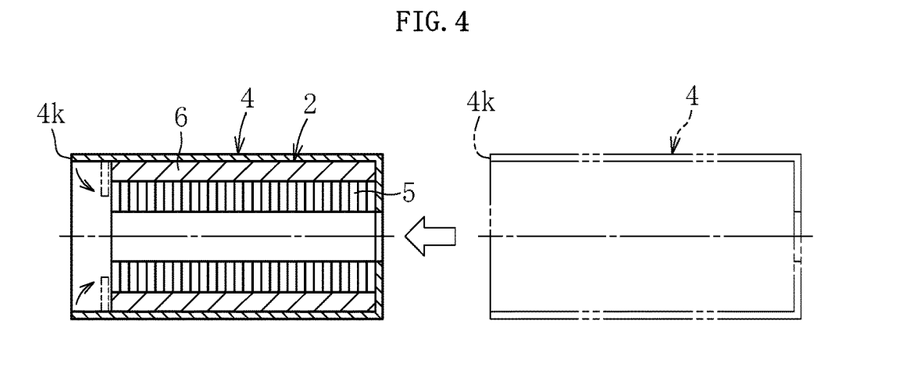
FIG. 4 is a diagram showing a method of fixing a cover member according to a comparative example.

Meanwhile, as a method of fixing the cover members 4 to the rotor 2 in addition to a method of caulking a part of the rotary shaft 3 as in the present invention, the cover members 4 can be caulked and fixed to the rotor 2. For example, as shown in FIG. 4, after a cylindrical cover members 4 having a bottomed cylindrical shape that is longer in the axial direction than the rotor 2 is attached to the outer periphery of the rotor 2, an opening edge 4k of each cover member 4 is bent toward the inner diameter to form an end wall as shown by a dotted line in FIG. 4, thereby fixing each cover member 4 to the rotor 2.

Figure 5:
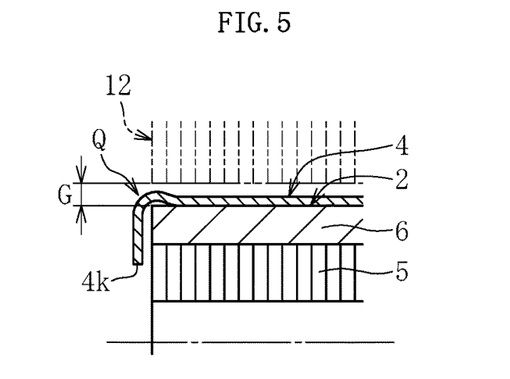
FIG. 5 is a diagram for describing a defect in a method of fixing the cover member according to the comparative example.

However, when the opening edge 4k of each cover member 4 is bent toward the inner diameter to form the end wall, as shown in FIG. 5, a bent part Q of each cover member 4 is deformed so as to expand in the outer diameter direction. A gap G between the outer peripheral surface of the rotor 2 and the inner peripheral surface of a stator 12 is controlled to be a significantly small value (for example, 0.6 mm). Even with a slight expansion of the cover members 4 in the outer diameter direction, the cover members 4 may interfere with the stator 12 when the rotor 2 to which the cover member 4 is attached is assembled to the inner periphery of the stator 12 to form an electric motor. Further, when the cover members 4 are caulked around the outer peripheral surface of the magnets 6 as in the example shown in FIG. 4, the magnets 6 may be loaded and damaged.

On the other hand, in the embodiment of the present invention, the pair of cover members 4 in which the end wall 4c is formed in advance (without caulking) is attached to the outer periphery of the magnets 6 such that the respective openings 4b face each other. Then, the cover members 4 are fixed by caulking a part of the rotary shaft 3. As described above, in a configuration according to the embodiment of the present invention, the cover members 4 do not have to be caulked after the cover members 4 are attached to the outer periphery of the magnets 6, and this can prevent the magnets 6 to be damaged by caulking. Further, the cover members 4 do not expand in the outer diameter direction due to the caulking, and interference between the cover members 4 and the stator 12 can be avoided.

Figure 6:
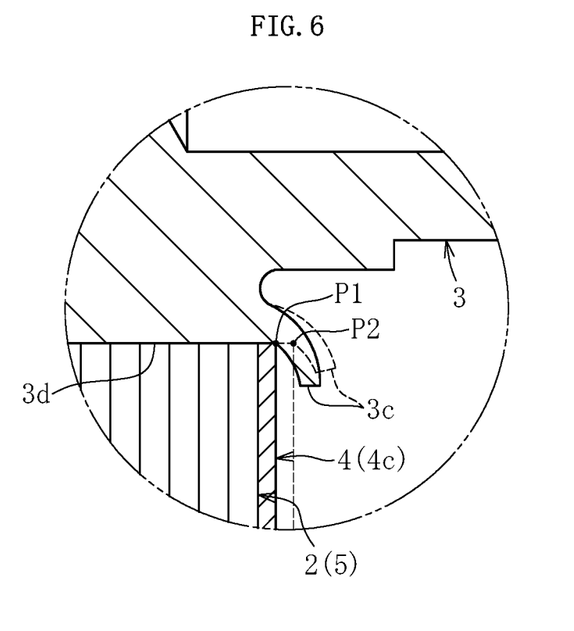
FIG. 6 is a diagram showing an aspect in which a caulking position is changed in accordance with dimensional variation.

Fixing with the caulking part 3c as in the embodiment of the present invention allows highly accurate positioning of the rotor 2 and the cover members 4 and reliable fixing of the cover members 4 to the rotor 2 even if there is some variation in an axial length of the rotor core 5 or a thickness of the cover members 4. Specifically, as shown in FIG. 6, even if a position of an inner diameter edge of each cover member 4 changes between a position P1 and a position P2 in FIG. 6 due to variations in the axial length of the rotor core 5 or the thickness of each cover member 4, the caulking part 3c is bent in the outer diameter direction with respect to an arbitrary point from the position P1 to the position P2 of the inner diameter edge of each cover member 4 in any case and caulked. Thus, a position of each cover member 4 can be restricted without creating a gap in the axial direction.

On the other hand, in a method of positioning the rotor 2 and the cover members 4 using a retaining ring, a groove is to be formed such that the retaining ring can be attached even when the axial length of the rotor core 5 and the thickness of the cover members 4 are maximum. On the contrary, when the axial length and the thickness are minimum, a gap in the axial direction is created between the retaining ring and the cover members 4, and the rotor 2 and the cover members 4 cannot be positioned with high accuracy. In contrast, upon positioning the rotor 2 and the cover members 4 using the caulking part 3c, a caulking position of the caulking part 3c can be changed in accordance with dimensional variations of the rotor core 5 and the cover members 4. Thus, the caulking part 3c can engage with the inner diameter edge of each cover member 4 without creating a gap in the axial direction, and the rotor 2 and the cover members 4 can be positioned with high accuracy.

Figure 7:
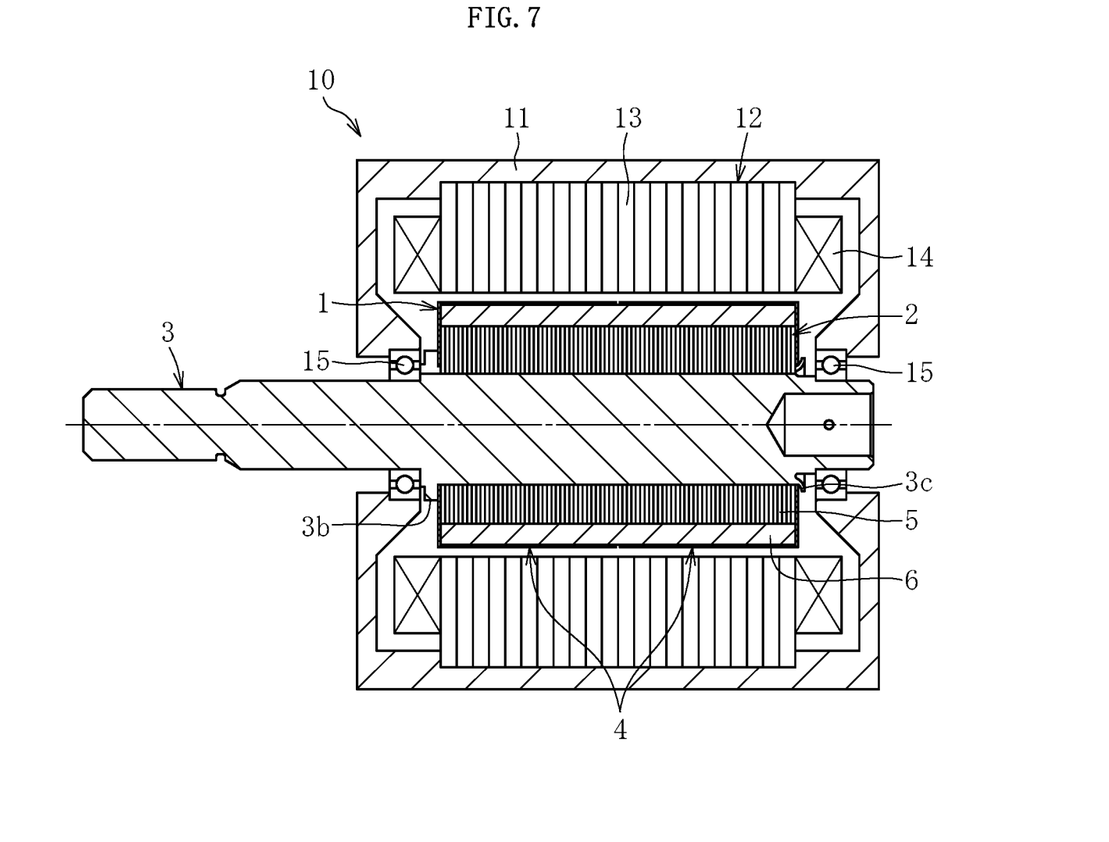
FIG. 7 is a vertical sectional view showing an example of an electric motor using the rotor unit of the present invention.

FIG. 7 is a vertical sectional view showing an example of an electric motor using the rotor unit of the present invention.

An electric motor 10 shown in FIG. 7 includes a rotor unit 1, a stator 12, and a casing 11 as main constituent elements. The rotor unit 1 includes the rotor 2, the rotary shaft 3, and the cover members 4 as in the above embodiment. The rotary shaft 3 is rotatably supported by the casing 11 by a pair of bearings 15 provided on both sides of the rotor 2 in the axial direction. The rotor 2 and the cover members 4 rotate as the rotary shaft 3 rotates. Meanwhile, the stator 12 includes a stator core 13 and a stator coil 14, and is fixed to the casing 11. Further, the stator 12 is disposed closer to the outer diameter than the rotor 2 with a gap in a radial direction therebetween.

As described above, in the electric motor 10 using the rotor unit 1 of the present invention, the caulking part 3c restricts the axial movements of the rotor 2 and the cover member 4 and facilitates the highly accurate positioning of the rotor 2 and the cover members 4 as in the above embodiment. This makes it possible to prevent fluctuations highly effectively in a magnetic circuit between the stator 12 and the rotor 2 due to an axial displacement of the rotor 2 and provide a reliable electric motor with stable performance.

Figure 8:
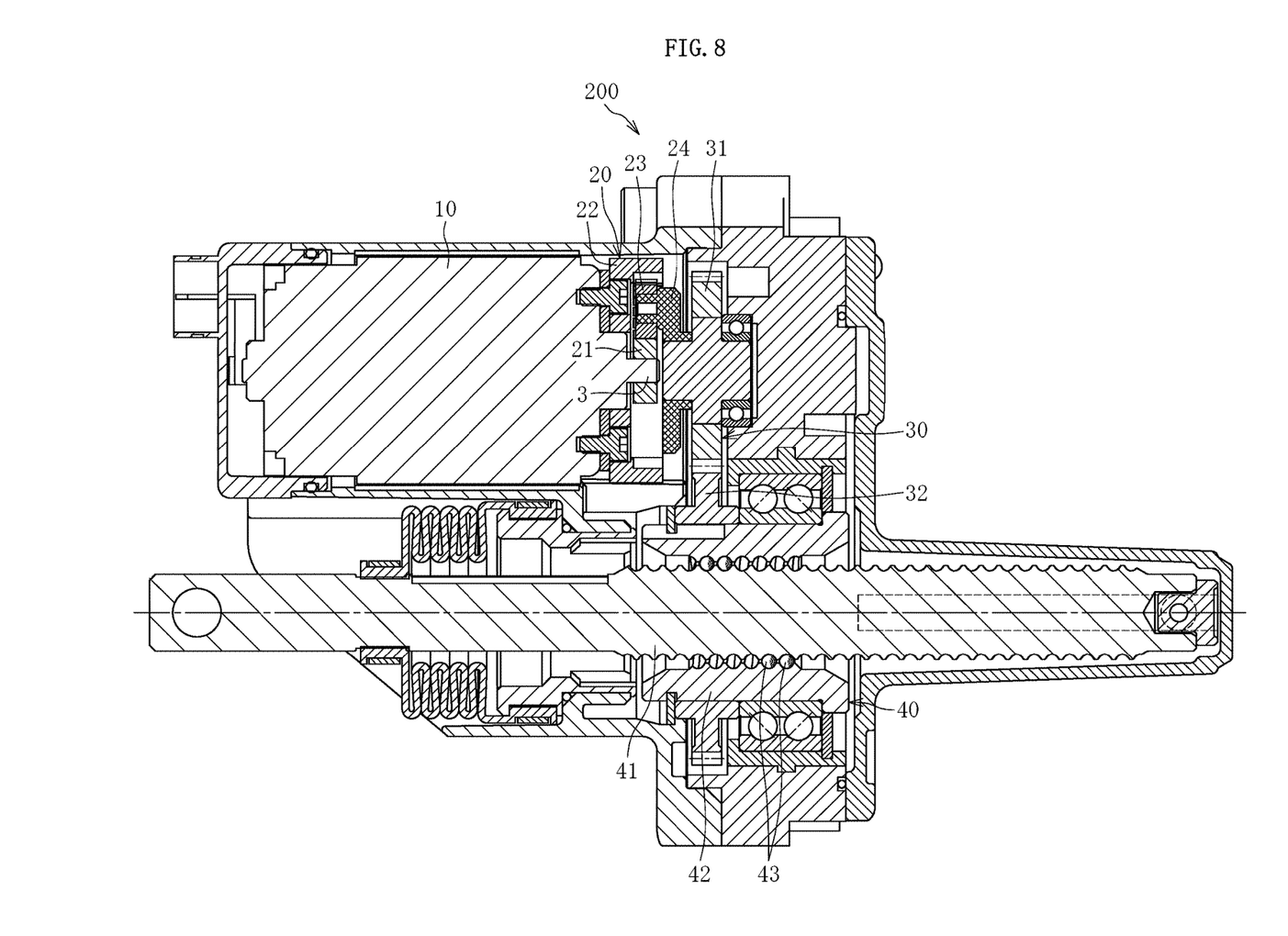
FIG. 8 is a vertical sectional view showing an example of an electric actuator including the electric motor of the present invention.

Further, FIG. 8 shows an example of an electric actuator provided with the electric motor of the present invention.

An electric actuator 200 shown in FIG. 8 mainly includes the electric motor 10 as a drive source, a speed reduction mechanism 20 that decelerates and transmits a rotation of the electric motor 10, a transmission gear mechanism 30 that transmits a rotary motion of the speed reduction mechanism 20 to be a rotary motion centered on an axis in parallel with the rotary shaft 3 of the electric motor 10, and a motion conversion mechanism 40 that converts the rotary motion transmitted by the transmission gear mechanism 30 into a linear motion.

In the example shown in FIG. 8, a planetary gear speed reduction mechanism is adopted as the speed reduction mechanism 20. Specifically, the speed reduction mechanism 20 includes a sun gear 21 that rotates integrally with the rotary shaft 3 of the electric motor 10, a ring gear 22 fixed closer to the outer diameter than the sun gear 21, a plurality of planetary gears 23 arranged between the sun gear 21 and the ring gear 22, and a carrier 24 that holds the planetary gears 23 and rotates. In response to a rotation of the sun gear 21 together with the rotary shaft 3 of the electric motor 10, the plurality of planetary gears 23 revolve along the ring gear 22 while rotating. Then, the revolution of the planetary gear 23 causes the carrier 24 to rotate, which decelerates and transmits the rotation of the electric motor 10.

The transmission gear mechanism 30 includes a small-diameter drive gear 31 connected to the carrier 24 of the speed reduction mechanism 20 so as to rotate integrally with the carrier 24, and a large-diameter driven gear 32 meshing with the drive gear 31. In response to a rotation of the small-diameter drive gear 31 together with the carrier 24, the driven gear 32 rotates accordingly. Thus, the rotary motion of the speed reduction mechanism 20 (carrier 24) is converted to the rotary motion centered on the axis in parallel with the rotary shaft 3 of the electric motor 10. Further, in the present embodiment, the rotation is further reduced by the rotary motion being transmitted from the small-diameter drive gear 31 to the large-diameter driven gear 32.

A ball screw mechanism is adopted in the motion conversion mechanism 40. Specifically, the motion conversion mechanism 40 includes a screw shaft 41 disposed on the axis parallel to the rotary shaft 3 of the electric motor 10, a nut 42 disposed on an outer periphery of the screw shaft 41, multiple balls 43 disposed between spiral grooves formed on an outer peripheral surface of the screw shaft 41 and an inner peripheral surface of the nut 42, and a circulation member (not shown). The driven gear 32 of the transmission gear mechanism 30 is provided on the outer peripheral surface of the nut 42 so as to integrally rotate. Thus, in response to a transmission of the rotary motion input from the electric motor 10 to the driven gear 32 via the drive gear 31, the driven gear 32 rotates, and the nut 42 of the motion conversion mechanism 40 rotates integrally with the driven gear 32. With the rotation of the nut 42, the plurality of balls 43 moves along the spiral grooves and circulates through the circulation member, and the screw shaft 41 moves forward or backward in the axial direction. In this way, as the screw shaft 41 moves forward or backward, the rotary motion from the electric motor 10 is converted into a linear motion in the axial direction parallel to the rotary shaft 3.

In such an electric actuator, the electric motor may generate heat when energized or may be affected by heat from the outside depending on the use environment. Thus, to fix the cover members to the rotor by using an adhesive as in the known art, the adhesive is to be selected in consideration of heat resistance and heat resistance life. On the other hand, a configuration in which the cover members are mechanically constrained by the caulking part as in the electric motor of the present invention eliminates the need for selecting an adhesive and reduces a risk of a decrease in the fixing force due to deterioration over time. Thus, the cover members can be reliably fixed, and the position of the cover members can be reliably restricted.

In an electric actuator, even if a few fragments of the rotor magnets are scattered, the fragments that have entered a drive transmission part of the ball screw mechanism or the gear mechanism (for example, a ball rolling surface of the ball screw or a meshing part of gears) may affect a smooth drive transmission or completely disable the drive in the worst case. However, application of the electric motor of the present invention can reliably prevent the cover members from being detached from the rotor and can favorably maintain effect of the cover members preventing the fragments of the magnets from scattering for a long period of time. Furthermore, covering the magnets entirely with the cover members as in the above embodiment can reliably prevent the fragments of the magnets from scattering even if the magnets should be damaged, and it is therefore possible to provide a highly reliable electric actuator.

Although the present invention has been described above, the present invention is not limited to the above embodiment. Needless to say, the present invention can be implemented in various forms without departing from the gist of the present invention. In the above embodiment, the rotary shaft 3 is provided with the caulking part 3c and the flange 3b as the movement restrictors that restrict the axial movement of the rotor as shown in FIG. 1. However, a retaining ring such as a circlip configured separately from the rotary shaft 3 may be used instead of the flange 3b. The electric actuator to which the electric motor of the present invention is applied is not limited to the electric actuator shown in FIG. 8. The electric motor of the present invention is applicable to an electric actuator provided with only one of the speed reduction mechanism or the motion conversion mechanism described above.

REFERENCE SIGNS LIST 1 rotor unit
2 rotor 2a protruding engagement part
3 rotary shaft
3a recessed engagement part
3c caulking part
4 cover member
4a peripheral wall
4b opening
4c end wall
5 rotor core
6 magnet
10 electric motor
12 stator
20 speed reduction mechanism
40 motion conversion mechanism
200 electric actuator

The invention claimed is:

1. A rotor unit used in an electric motor, the rotor unit comprising:
    a rotor core;
    a rotary shaft inserted in an inner periphery of the rotor core;
    a plurality of magnets attached to an outer peripheral surface of the rotor core; and
    a cover member covering an outer periphery of each of the plurality of magnets, wherein
    the rotary shaft is provided, on an outer peripheral surface of the rotary shaft, with a caulking part configured to restrict an axial movement of the rotor core with respect to the rotary shaft,
    the caulking part is configured to restrict an axial movement of the cover member with respect to the rotor core,
    a groove for forming the caulking part is provided on an inner diameter side of a portion of the rotary shaft where the caulking part is provided,
    the groove is recessed in an axial direction,
    an inner peripheral surface of the rotor core has a plurality of protruding engagement parts at intervals in a peripheral direction,
    the outer peripheral surface of the rotary shaft has a plurality of recessed engagement parts at intervals in the peripheral direction, the plurality of recessed engagement parts being engaged with the plurality of protruding engagement parts, and
    the caulking part is divided in the peripheral direction via the plurality of recessed engagement parts.

2. The rotor unit according to claim 1, wherein the cover member includes a pair of cover members each having a peripheral wall covering the outer periphery of each of the magnets, an opening disposed at a first axial end of the peripheral wall, and an end wall provided at a second axial end of the peripheral wall and covering an end surface of each of the magnets and an end surface of the rotor core, the pair of cover members being attached to the outer peripheries of the magnets with the respective openings facing each other.

3. The rotor unit according to claim 1, wherein the cover member is held in the axial direction by the caulking part and the rotor core.

4. The rotor unit according to claim 1, wherein the cover member has a cylindrical shape entirely covering the plurality of magnets.

5. An electric motor comprising:
    the rotor unit according to claim 1; and
    a stator configured to impart rotational force to the rotor core.

6. An electric actuator comprising:
    the electric motor according to claim 5; and
    a motion conversion mechanism configured to convert a rotation of the electric motor into a linear motion or a speed reduction mechanism configured to decelerate and transmit the rotation of the electric motor.

* * * * *